July 9, 1946.  C. D. TUSKA  2,403,622
OBSTACLE DETECTING SYSTEM
Filed July 30, 1938
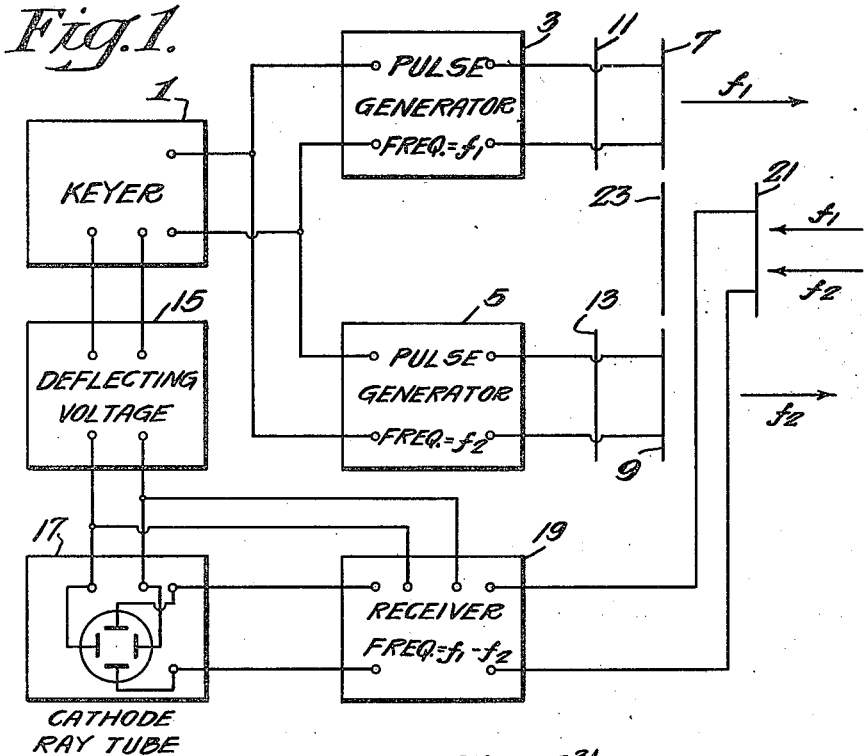
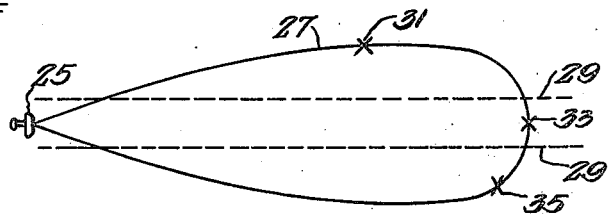
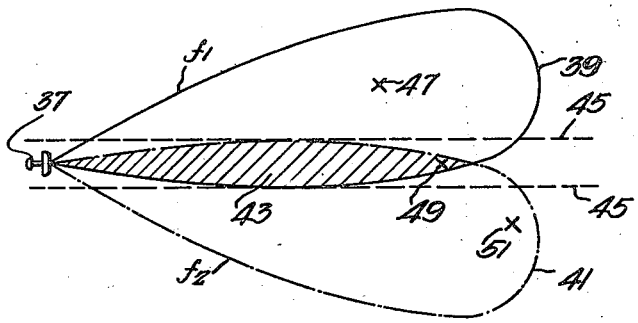
Inventor
Clarence D. Tuska
By
Attorney Patented July 9, 1946

2,403,622

UNITED STATES PATENT OFFICE 2,403,622

OBSTACLE DETECTING SYSTEM

Clarence D. Tuska, Philadelphia, Pa., assignor to Radio Corporation of America, a corporation of Delaware Application July 30, 1938, Serial No. 222,088

4 Claims. (Cl. 250—11)

This invention relates to obstacle detection and more specifically to a system in which pulses of radio frequency energy are directively radiated to be reflected by an object to be detected.

Obstacle detecting systems using radio frequency energy have been proposed. In one system, a pulse of radio frequency energy is radiated toward an object and simultaneously with the radiation a cathode ray is deflected along one path. After the pulse of radio frequency energy has been reflected by an obstacle, it is applied to a receiver which is connected to deflecting electrodes of the cathode ray tube so that the ray may be deflected at an angle to its first mentioned path. If the cathode ray traverses the first mentioned path at a uniform rate dependent upon the range of the obstacle detector and starting in synchronism with each outgoing pulse, the received reflected signals will cause the second mentioned deflections at points proportional to the distance from the transmitter to the reflected object.

One of the difficulties with systems of this type is that the indication of the reflections is proportional to the time required for the radio wave to travel to the object and back to the receiver and such indications are independent of direction. With such systems, the observer is unable to distinguish between indications resulting from reflected waves arriving at different angles. For example, if one reflection is caused by an object due north of the observer a distance of 1500 meters, an exactly similar indication will result from an object 1500 meters northeast of the observer. One obvious correction of this difficulty is to make the radiated waves as directive as possible. If the obstacle detector is to be used in a fixed position where sufficient space is available, it is possible to erect an antenna array which will provide the required degree of directivity.

If the obstacle detecting system is to be used on a relatively small vehicle such as an airplane, it becomes very difficult to erect an antenna system which will have the required directivity and will not at the same time put unreasonable drag on the craft. Perhaps an obvious solution of the antenna array for aircraft would be the utilization of extremely high frequencies which would permit the use of a reflector for focusing or beaming the waves. While this solution is practical from the standpoint of the antenna, it requires the generation of waves having a frequency of the order of 3,000,000,000 cycles per second. While currents of such frequencies are generated in the laboratory, it does not seem entirely practical to generate, amplify and detect radio frequency oscillations of the above mentioned frequency in any practical installation on an aircraft.

It is an object of this invention, therefore, to obtain the required directivity for obstacle detection by utilizing pulses of radio frequency energy having a frequency of the order of 500 megacycles per second and utilizing directive antennas of such construction as are practical on airplanes. It is a further object of this invention to provide means whereby radio frequency fields having an overlapping portion of the required directivity for obstacle detection are established. It is a still further object to provide means for directively and simultaneously radiating pulses of radio frequency energy of different frequency in different directions whereby the simultaneous reception of these waves operates a receiver responsive to the difference in frequency of the pulses. A still further object of the invention is to provide means for distinguishing indications obtained by reflections from obstacles located on the desired course from objects to the left or right of the course.

The invention will be described by reference to the accompanying drawing in which Figure 1 is a schematic illustration of one embodiment of the invention, and Figures 2 and 3 are graphic illustrations used in describing the invention.

Referring to Fig. 1, a keyer 1 is connected to a pair of pulse generators 3, 5. The pulse generators have output frequencies $f_1$ and $f_2$, respectively. The output currents from the generators are applied respectively to the antennas 7, 9 which may be dipoles or the like. The antennas preferably include reflectors 11, 13. The reflectors are of such size and arrangement as will substantially prevent radiation in one direction and will concentrate the radiation in the opposite direction as will hereinafter be described. The keyer is also connected through a suitable network 15 which provides a deflecting voltage for one pair of deflecting electrodes of a cathode ray tube 17. The keyer may also be connected either directly or through the network 15 to a receiver 19. The input of the receiver 19 is connected to a receiving antenna 21 which may include a reflector 23. In some installations either or both of the transmitting antennas 7, 9 may be used as the receiving antenna. The output of the receiver is connected to a second pair of deflecting electrodes of the cathode ray tube 17.

The principle of operation is as follows: The keyer 1 generates pulses which are sharply defined and of an interval of the order of a fraction of a micro-second. These pulses are simultaneously applied to the pulse generators of frequency $f_1$ and $f_2$ whereby the generators are keyed on for a brief interval. The "on interval" is followed by an "off interval" which is long enough to permit the outgoing waves to travel to a distant object and return before the next pulse of radio frequency energy is radiated. The two transmitting antennas 7, 9, together with their reflectors 11, 13 are arranged to direct the radiation so that the major axes of the field patterns are directed toward the obstacles to be detected along the course of the moving craft carrying the apparatus.

The transmitted pulses of radio frequency energy $f_1$ and $f_2$ are radiated toward a distant object to be reflected from the object back to the receiving antenna 21 which may be made directive along the desired course. The received waves induce currents in the directive antenna 21 which are applied to any suitable means for combining the two currents to derive a current of a frequency equal to the difference in frequency of the transmitted pulses. For example, if the transmitted pulses have a frequency $f_1$ and $f_2$, respectively, the pulses, after reflection, will be combined in the receiver to generate currents of frequency $f_1-f_2$. These currents $f_1-f_2$ may be amplified and demodulated. The demodulated currents are impressed on the second pair of deflecting electrodes of the cathode ray tube 17. Since the receiver is only responsive to currents of the difference frequency $f_1-f_2$, it follows that the receiver will only respond when the two transmitted pulses, after reflection, simultaneously arrive at the receiver. In the event that one impulse, for example $f_1$, arrives before the second impulse $f_2$, there will be no current of difference frequency $f_1-f_2$ produced and therefore no signal will appear in the output of the receiver.

It should be understood that the receiving antenna may be suitably shielded to prevent direct pickup from the transmitting antennas. In the event that the shielding is insufficient and to prevent any residual currents from blocking the receiver, it is preferable to apply an initial biasing impulse, which may be derived directly or indirectly from the keyer 1, to make the receiver inoperative for the brief instant at which the radiation takes place from the transmitter. It should also be understood that the receiver may utilize a conventional radio frequency detector and audio frequency circuits.

In Fig. 2 is illustrated an aircraft 25 from which pulses of radio frequency energy having a field pattern 27 are radiated. The course of the plane, with a factor of safety on either side thereof, is indicated by the dash lines 29. In the event that objects are present at points 31, 33 and 35, it will be seen that the system would be responsive to reflections from all three objects. These reflections on the conventional system would all appear as obstacles to be avoided by the operator of the aircraft. However, it follows, from inspection, that the objects represented by the reference numerals 31 and 35 are sufficiently off the course as to represent no obstacle in the path of the airplane. With respect to the object indicated by the reference numeral 33, this would represent an obstacle to be avoided.

While the foregoing system has the characteristics shown in Fig. 2, the system with this invention has the characteristics represented by Fig. 3. In this illustration pulses of radio frequency energy $f_1$, $f_2$ having field patterns 39, 41, respectively, are simultaneously radiated from the aircraft 37. It will be seen that these field patterns have a common or overlapping portion 43 which sharply defines the path of the craft as represented by the dash lines 45. In the event that there are reflecting objects as indicated by the reference numerals 47, 49, 51, it follows that reflections from 47 will only contain energy of frequency $f_1$ while reflections from the object represented by reference numeral 51 will only contain energy of frequency $f_2$. Since these objects are located at different distances from the plane, the reflected energy will not arrive simultaneously and will not cause any undesired indication. If, however, an obstacle represented by reference numeral 49 lies in the overlapping portion of the fields, the reflected pulses $f_1$ and $f_2$ will reach the receiver simultaneously and will, therefore, cause an indication. While the system of the invention thus appears to limit itself to obstacles directly on the course of the plane, it will appear that two objects located at equal distances, although not on the desired course, may cause reflections to be simultaneously received and indicated. Such a situation is probably unlikely and would be transitory instead of giving a continuous indication.

Thus, it appears that the present system simultaneously radiates impulses of two different radio frequencies along slight different paths having a common field portion. The transmitted pulses are reflected and if the reflections of the two frequencies arrive simultaneously at the receiver, they are combined to produce an indication. In the event that the pulses arrive at different times, they are not combined and no indication is obtained. In general, the simultaneous reflection will only occur in the common portion of the overlapping fields. No attempt has been made to describe the keyer, pulse generators, cathode ray tube or deflecting voltage network, as these elements are well known to those skilled in the art.

I claim as my invention:

1. In an obstacle detector system, the combination of a keyer, a pair of pulse generators of radio energy of different frequency, means connecting said keyer and said generators whereby said generators are simultaneously keyed, means for directively radiating said keyed pulses of radio energy, said radiation having different field patterns and a portion thereof overlapping, and means for receiving said pulses after reflection from said obstacle, said receiving means being responsive to currents of the difference frequency of said first mentioned frequencies and being unresponsive unless said currents of both frequencies are simultaneously applied.

2. In a system of the character of claim 1 a cathode ray tube including ray deflecting means, means for deflecting said ray in synchronism with said keying, and means for indicating on said cathode ray tube the simultaneous reception of said signals.

3. The method of detecting objects by means of pulses of radio energy which includes radiating pulses of radio frequency energy in different directions, each of said pulses comprising a train of radio frequency waves, adjusting directivity of said radiations to establish a common field, deriving currents from the reflection of said pulses, combining said currents upon simultaneous reception, demodulating said combined currents, and indicating the presence of a pulse reflecting object in said common field as a function of said demodulated currents.

4. The method of detecting objects by means of pulses of radio energy which includes, generating radio currents of different frequencies, simultaneously and directively radiating said pulses whereby the patterns of said radiations have a common portion, receiving said radiated pulses after reflection from an object, deriving currents of different frequency from said reception, combining said currents of different frequency when said simultaneous pulses are simultaneously received, deriving from said combined currents a current whereof the frequency is equal to the difference between the frquencies of the combind currents, demodulating said different frequency current, and indicating the presence of a pulse reflecting object in said common portion as a function of said demodulated currents.

CLARENCE D. TUSKA.